Dec. 16, 1952    R. E. CLARRIDGE    2,621,519
TEMPERATURE COMPENSATED THERMOMETER
Filed Sept. 2, 1948
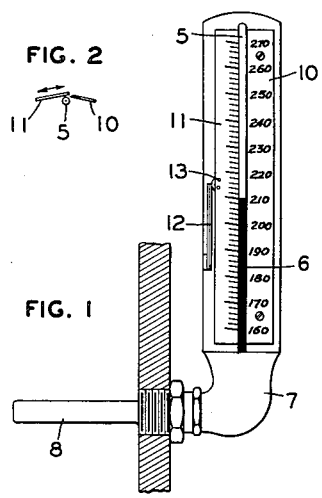
FIG. 2
FIG. 1
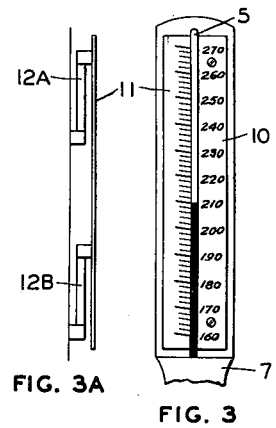
FIG. 3A
FIG. 3
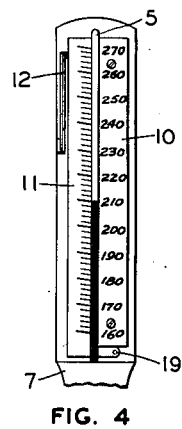
FIG. 4
FIG. 8
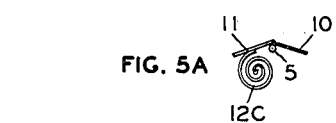
FIG. 5A
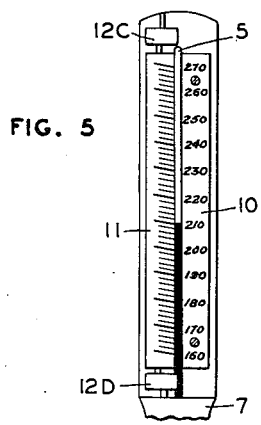
FIG. 5
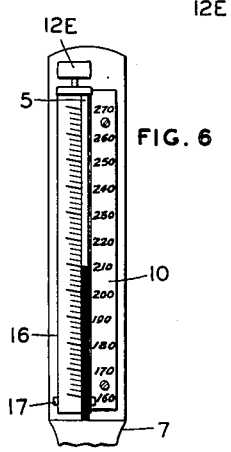
FIG. 6
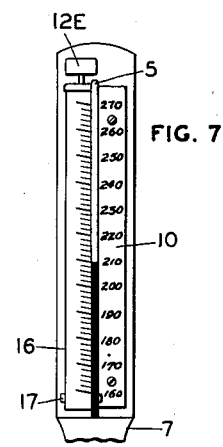
FIG. 7
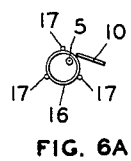
FIG. 6A
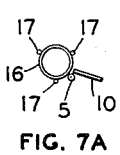
FIG. 7A
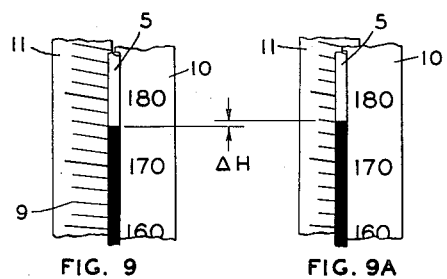
FIG. 9    FIG. 9A
*INVENTOR.*
RALPH E. CLARRIDGE
BY
D. Clyde Jones
ATTORNEY Patented Dec. 16, 1952

2,621,519

UNITED STATES PATENT OFFICE 2,621,519

TEMPERATURE COMPENSATED THERMOMETER

Ralph E. Clarridge, Rochester, N. Y., assignor to Taylor Instrument Companies, Rochester, N. Y., a corporation of New York Application September 2, 1948, Serial No. 47,445

4 Claims. (Cl. 73—368)

This invention relates to thermometers and more particularly to glass thermometers provided with a thermosensitive filling medium such as mercury.

When a conventional thermometer of the mentioned type is inclosed in a case of metal or the like, the thermometer is normally calibrated at one ambient case temperature only. However, when the case temperature deviates from this value, the reading of the thermometer will not be strictly accurate. For example, in a thermometer with a range 160° to 270° F., if the end of the mercury column or other thermosensitive liquid in the tube is located in the region of 160° F., the error due to a small change in case temperature will be small while if the liquid extends to 270° F., the error will be larger. This is due to this greater volume of mercury in the thermometer tube in the last assumed condition, and with this greater volume of mercury, a rise in the case and tube temperature will cause a greater temperature error than in the first assumed condition.

In accordance with the present invention, there is provided an arrangement whereby means are provided for automatically compensating for the errors which would otherwise be present where the thermometer case and the tube of the thermometer are exposed to a wide range of case temperatures.

In the drawings, Fig. 1 is a front elevation and Fig. 2 is a diagrammatic plan view of one form of thermometer in accordance with the present invention; Figs. 3 and 3A are views respectively illustrating a front elevation and a side elevation of a thermometer in accordance with a modified form of the invention; Fig. 4, Fig. 5, as well as Figs. 6, 6A and Figs. 7, 7A and 8 illustrate other modified forms of the invention, and Fig. 9 is a fragmentary front view of a thermometer at one ambient temperature. Fig. 9A is a similar fragmentary front view of the thermometer at a different ambient temperature.

Referring to Figs. 1 and 2, there is disclosed a glass thermometer comprising a capillary tube 5, communicating through a capillary stem (not shown), with a bulb (also not shown) containing a filling medium such as mercury 6. The thermometer is mounted in a case 7 which terminates in a well-known protective metal bulb 8 which forms no part of the present invention. The case has mounted therein a scale plate or plates suitably graduated in degrees of temperature. As herein illustrated, the scale plate comprises a fixed plate 10 secured to the case at the right of the tube and bearing numerals corresponding to the degree of temperature being indicated. The other part 11 of the scale plate at the left of the tube bears a calibrated scale and is movable edgewise toward and away from the tube (Fig. 2). The graduation lines do not extend perpendicular to the principal axis of the tube but are inclined slightly with respect thereto. These graduations are progressively more inclined in passing from the lower range to the higher range of the thermometer. It has been mentioned that the scale plate 11 is movable edgewise toward the thermometer tube. This movement is effected by a straight bimetallic unit 12 which is responsive to the ambient temperature. As herein illustrated, the lower end of the unit 12 is secured to the case while its upper end is connected to the scale plate 11 at 13.

Let it be assumed that a thermometer of the mentioned range, namely from 160° to 270° F., is calibrated with its case at 110° F. At the ambient temperature of 110° F., when the temperature at the bulb is 176° F., the mercury column 6 in the thermometer will indicate this temperature correctly as shown in Fig. 9. If, however, the ambient temperature of the case and tube changes to 140° F., although the temperature at the bulb is still 176° F., there will be an increment ΔH in the height of the mercury column due to the further expansion of the mercury in the tube, as a result of the increased ambient temperature. However, with the construction of the present invention, if the temperature of the case rises to 140° F., due to ambient conditions, then the bimetallic unit 12 will move the scale plate 11 toward the tube, Fig. 9A, thereby increasing the effective distance between the adjacent graduating lines, with the greatest separation between the adjacent lines being at the upper portion of the scale plate. This compensation still causes the thermometer to indicate 176° F. in spite of the increased ambient temperature at the case.

The modified form of the invention shown in Figs. 3 and 3A is similar to that illustrated in Figs. 1 and 2, but differs therefrom in that the upper part of the scale plate 11 is mounted on the straight bimetallic unit 12A, while the lower part thereof is mounted on the straight bimetallic unit 12B. These units, which are mounted on the case, are arranged in such a manner that in responding to ambient temperatures, they move the scale plate 11 in the proper direction to compensate for these temperatures.

The modified form of the invention disclosed in the Fig. 4 differs from that illustrated in Fig. 1 in that the scale plate 11 is pivoted at its lower end on a pin 19 carried by the case. In this construction, when the bimetallic unit 12 responds to changes in ambient temperature, the scale 11 will rock toward or away from the tube 5 to compensate for ambient temperature changes.

In the modified form of the invention shown in Figs. 5 and 5A, the adjustable scale plate 11 is moved by two coiled bimetallic elements 12C and 12D located respectively at the upper and lower ends of the scale plate 11, one end of each bimetallic element being fixed to the case, the other end thereof being fixed to the movable scale plate. Thus, in response to ambient temperature changes, the movable scale plate 11 is automatically adjusted in the same manner as in the construction in Fig. 1, to compensate for ambient temperature errors that would otherwise be present.

In the modified form of the invention shown in Figs. 6 and 6A the movable scale plate 11 is replaced by a transparent cylinder 16 surrounding the tube 5 of the thermometer. The thermometer tube is preferably located close to the inside surface of the back of the cylinder 16 (Fig. 6A) and the front surface of the cylinder is provided with graduating lines arranged in a manner similar to those on the scale plate illustrated in Fig. 1. In this form of the invention, a bimetallic coil 12E (Fig. 8) having its ends respectively connected to the case 7 and to the cylinder 16, is responsive to the ambient temperatures to rotate the cylinder in order to bring different portions of graduations into reading relation to the thermometer tube. Suitable rollers 17 carried by the case 7 guide the lower end of the cylinder 16.

The modified form of the invention shown in Figs. 7 and 7A differs from the form shown in Figs. 6 and 6A, in that the thermometer tube 5 is located outside of the cylinder 16 (Fig. 7A) in the space between the cylinder and the fixed scale plate 10. In this modification also, the bimetallic coil 12E is effective to rotate the cylinder 16 to bring different portions of the graduated lines thereon into reading relation with the thermometer tube 5.

What I claim is:

1. In a thermometer including a glass tube communicating with a bulb containing a thermosensitive liquid and a case provided with a scale plate in cooperative relation with said tube, said plate having graduation lines extending in a direction transversely of said tube, said lines being progressively more inclined with respect to the main axis of the tube from the lower end of the temperature range on the scale plate to the high end of said range, and means including a bimetallic temperature responsive strip located at said case for moving said scale plate in a direction generally at right angles to the main axis of said tube whereby the effect of changes in temperature at the case will be compensated for in the readings of the thermometer.

2. A thermometer including a straight glass capillary tube communicating with a bulb containing a thermosensitive liquid and a scale plate in cooperative relation with said tube, said scale plate having graduation marks thereon along said tube related to the height of the liquid in the tube, said graduation marks extending in a direction to intersect the main axis of the tube and having portions with equal spaces between adjacent portions effective at a given ambient temperature at the scale for indicating the temperature at the bulb, the remaining portions of said graduation marks defining spacing between adjacent marks which changes from one end of the scale to the other, temperature responsive mechanism located at said case and means including said mechanism for causing relative movement between the tube and the scale plate in response to ambient temperature changes at said scale plate.

3. In a thermometer including a glass tube communicating with a bulb containing a thermosensitive liquid and a case provided with a scale plate in cooperative relation with said tube, said plate having graduation lines extending in a direction transversely of said tube, said lines being progressively more inclined with respect to the main axis of the tube from the lower end of the temperature range on the scale plate to the high end of said range, and temperature responsive means located at said case for effecting relative movement between said scale plate and said tube in a direction at right angles to the main axis of said tube whereby the effect of changes in temperature at the case will be compensated for in the readings of the thermometer.

4. In a thermometer including a glass capillary tube communicating with a bulb containing a thermosensitive liquid and a scale member in cooperative relation with said tube, said member having graduation marks thereon related to the height of the liquid in the tube, said member being adjustable to vary the effective indicating spacing between adjacent graduation marks, mechanism located at said scale and responsive to ambient temperatures thereat, said mechanism being connected to adjust said member to vary the effective indicating spacing between adjacent graduation marks from the low temperature end of the range on said scale plate to the high temperature end of said range in response to an increase in ambient temperature at said scale.

RALPH E. CLARRIDGE.

REFERENCES CITED

The following references are of record in the file of this patent:

UNITED STATES PATENTS

| Number | Name | Date |
|---|---|---|
| 739,967 | Wohl et al. | Sept. 20, 1903 |
| 1,712,653 | Egloff | May 14, 1929 |
| 2,143,775 | Hertel | Jan. 10, 1939 |
| 2,293,064 | Kahn | Aug. 18, 1942 |

FOREIGN PATENTS

| Number | Country | Date |
|---|---|---|
| 445,626 | Great Britain | Apr. 16, 1936 |
| 653,087 | Germany | Dec. 17, 1936 |